July 18, 1933.    F. SCHRÖTER    1,918,291
ARRANGEMENT FOR BROADCASTING ON WAVES OF ONE METER AND ONE DECIMETER
Filed April 5, 1930
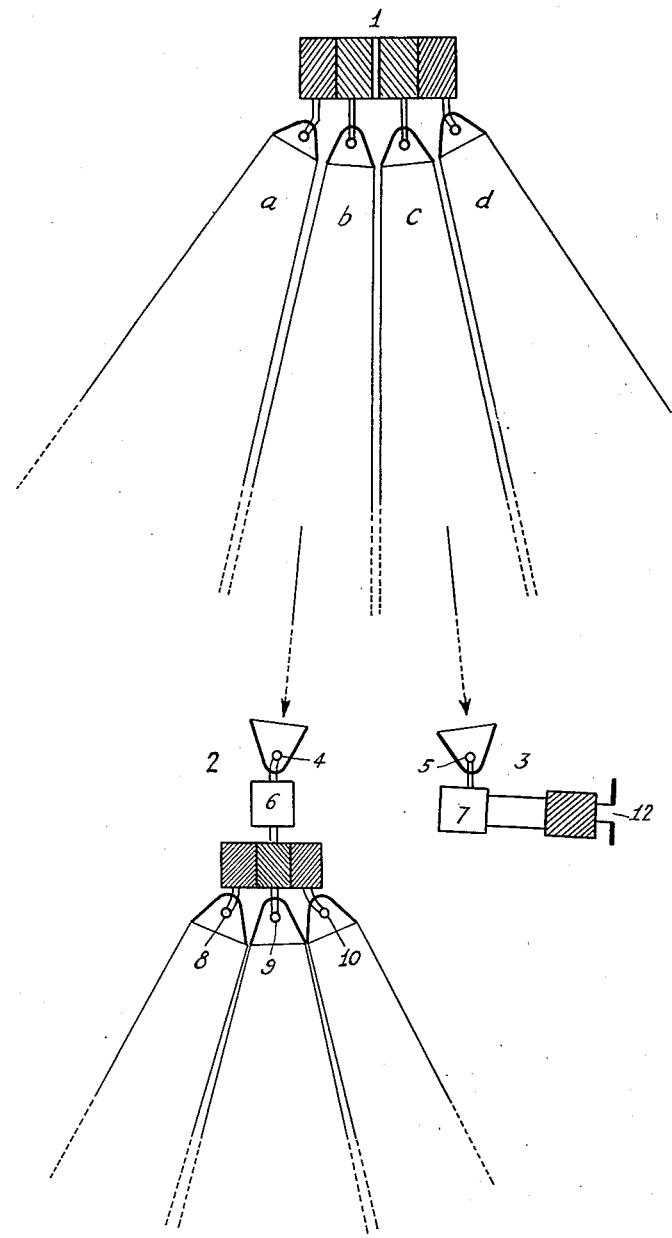
INVENTOR
FRITZ SCHRÖTER
BY
ATTORNEY Patented July 18, 1933

1,918,291

UNITED STATES PATENT OFFICE

FRITZ SCHRÖTER, OF BERLIN, GERMANY, ASSIGNOR TO TELEFUNKEN GESELLSCHAFT FÜR DRAHTLOSE TELEGRAPHIE M. B. H., OF BERLIN, GERMANY, A CORPORATION OF GERMANY

ARRANGEMENT FOR BROADCASTING ON WAVES OF ONE METER AND ONE DECIMETER

Application filed April 5, 1930, Serial No. 441,973, and in Germany April 24, 1929.

In my co-pending application Serial No. 441,971, filed in the United States April 5, 1930, I have disclosed the use of radio beams of ultra-short waves (say, of an order of one meter or one decimeter) for the production of "radiation lines" to be used in the transmission of rapid electrical signals. Arrangements of this kind, according to the present invention, are useful for broadcast work in that by their means a network of radiation centers is created which latter are associated with one or more parent transmitters by means of radio radiations sent out or received in the form of a beam.

One embodiment of the idea is illustrated in the drawing. From a central point 1 a number of transmitters being rendered directional, for instance, by the aid of reflectors and hereinafter called collectively the parent transmitter stations, radiate into sectors $a$, $b$, $c$, $d$, so that a fan of beams is produced which cover the entire territory which is to be supplied. For energy amplification inside this territory, relay stations are provided which consist of the combination of a sharply directive and therefore selective receiver either with one or with several transmitters radiating beam-fashion into several directions, or else with a non-directional transmitter radiating in all directions. The former case is schematically indicated by an arrangement denoted by 2, and the other case by an arrangement indicated at 3. 4 and 5 denote the receivers equipped with collective reflectors. 6 and 7 are amplifiers, 8, 9, 10 directive transmitters. 11 is a non-directional transmitter comprising, e. g., a vertical radiation dipole 12, and radiating uniformly in all horizontal senses (as shown in the drawing turned an angle of 90 degrees). The invention, however, may be carried into practice also in such a way that the parent transmitter 1 sends out non-directional radiations, while the selective receivers of the relay stations are directional in action.

In all cases, for an economical utilization of the energy consumed by the parent transmitter and the relay transmitters, it is most suitable to bunch the radiations so sharply in the vertical plane that the resultant beam will fall as perfectly as possible inside the transmitter horizon, that is to say, that it will predominantly cover only the territory to be served and will not be dissipated in space.

I claim:—

1. An arrangement for broadcasting over a wide angular sector electromagnetic waves of the order of one meter or less in wave length comprising a plurality of highly directional transmitter units emitting simultaneously beams of waves of said order of magnitude within a relatively small angle, each of said units being placed adjacent each other and in such fashion that the simultaneously emitted beams are projected substantially inside the transmitter horizon and supplement each other so that a desired wide angular area has propagated through it electromagnetic wave energy of a wave length of said order of magnitude.

2. An ultra short wave repeating system for relaying signals of the order of one meter or so having, in combination, a transmitting station and a repeating station within the range of optical vision, said transmitting station having a highly directive reflector antenna arranged to concentrate the transmitted radiant energy in a direction towards said repeating station, said repeating station comprising a receiving directive antenna pointed at said transmitting station and a plurality of transmitting directive antennæ pointed away from said transmitting station, and parabolic reflectors for all of said antennæ.

FRITZ SCHRÖTER.